United States Patent
Kawaguchi et al.

(10) Patent No.: US 10,167,405 B2
(45) Date of Patent: Jan. 1, 2019

(54) AQUEOUS COLORING AGENT DISPERSION FOR INKJET, INK COMPOSITION, INKJET RECORDING METHOD, AND COLORED BODY

(71) Applicant: Nippon Kayaku Kabushiki Kaisha, Tokyo (JP)

(72) Inventors: Akira Kawaguchi, Tokyo (JP); Akio Kuwahara, Tokyo (JP)

(73) Assignee: NIPPON KAYAKU KABUSHIKI KAISHA, Tokyo (JP)

(*) Notice: Subject to any disclaimer, the term of this patent is extended or adjusted under 35 U.S.C. 154(b) by 207 days.

(21) Appl. No.: 15/045,044

(22) Filed: Feb. 16, 2016

(65) Prior Publication Data
US 2016/0160068 A1 Jun. 9, 2016

Related U.S. Application Data

(63) Continuation of application No. 14/374,484, filed as application No. PCT/JP2013/051507 on Jan. 24, 2013.

(30) Foreign Application Priority Data

Feb. 2, 2012 (JP) ................. 2012-020620

(51) Int. Cl.
| | | |
|---|---|---|
| C09D 17/00 | (2006.01) | |
| C09D 11/326 | (2014.01) | |
| C08K 5/23 | (2006.01) | |
| C08K 5/3415 | (2006.01) | |
| C08K 5/3417 | (2006.01) | |
| C08K 5/3437 | (2006.01) | |
| C09D 11/322 | (2014.01) | |
| C09D 11/03 | (2014.01) | |
| C09D 11/30 | (2014.01) | |
| C09D 11/328 | (2014.01) | |
| C09D 11/107 | (2014.01) | |
| C08F 293/00 | (2006.01) | |
| C08K 3/04 | (2006.01) | |

(52) U.S. Cl.
CPC ........ *C09D 17/001* (2013.01); *C08F 293/005* (2013.01); *C08K 5/235* (2013.01); *C08K 5/3415* (2013.01); *C08K 5/3417* (2013.01); *C08K 5/3437* (2013.01); *C09D 11/03* (2013.01); *C09D 11/107* (2013.01); *C09D 11/30* (2013.01); *C09D 11/322* (2013.01); *C09D 11/326* (2013.01); *C09D 11/328* (2013.01); *C08F 2438/00* (2013.01); *C08K 3/04* (2013.01); *Y10T 428/24802* (2015.01); *Y10T 428/24901* (2015.01)

(58) Field of Classification Search
CPC .................................................. C09D 17/001
USPC ....................................................... 523/160
See application file for complete search history.

(56) References Cited

U.S. PATENT DOCUMENTS

| | | | |
|---|---|---|---|
| 5,874,974 A * | 2/1999 | Courian ............... | B41J 2/04511 345/87 |
| 6,852,777 B1 | 2/2005 | Nakano et al. | |

(Continued)

FOREIGN PATENT DOCUMENTS

| | | |
|---|---|---|
| CN | 1675253 A | 9/2005 |
| EP | 1285949 A1 | 2/2003 |

(Continued)

OTHER PUBLICATIONS

Concise explanation of relevance in the Written Opinion of the International Searching Authority in corresponding PCT Application No. PCT/JP2013/051507.
Extended European search report in European Patent Application No. 13744093.9, dated Aug. 27, 2015.
First Office Action in Chinese Patent Application No. 201380007607. 6, dated Mar. 25, 2015.
Kengo, et al., "Aqueous Pigments Ink for High Photo Quality", DIC Technical Review No. Oct. 2004.

(Continued)

*Primary Examiner* — Doris L Lee
(74) *Attorney, Agent, or Firm* — Knobbe Martens Olson & Bear LLP

(57) ABSTRACT

An inkjet aqueous pigment dispersion which achieves high pigment concentration, exhibits favorable redispersion properties after drying, and does not exhibit changes in ink properties even when stored for a long time; and an ink composition using the aqueous pigment dispersion. The inkjet aqueous pigment dispersion contains a pigment, a liquid medium, and a polymer dispersion agent which is an A-B block polymer obtained by copolymerization using a mixture of an organic tellurium compound represented by formula (1) and an organic ditellurium compound represented by formula (2) as a polymerization initiator. The monomer for configuring the A block is at least one type of monomer represented by formula (3), and the monomer for configuring the B block is benzyl methacrylate and/or benzyl acrylate.

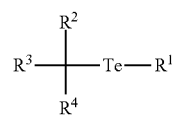

(1)

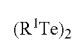

(2)

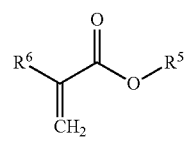

(3)

4 Claims, No Drawings

(56) References Cited

U.S. PATENT DOCUMENTS

| | | | |
|---|---|---|---|
| 7,291,690 B2 | 11/2007 | Yamago et al. | |
| 7,615,601 B2 | 11/2009 | Yamago et al. | |
| 2006/0167199 A1* | 7/2006 | Yamago | C08F 4/00 526/323 |
| 2007/0287770 A1* | 12/2007 | Nishiguchi | C09D 11/326 523/160 |
| 2008/0009597 A1 | 1/2008 | Yamago et al. | |
| 2008/0094457 A1* | 4/2008 | Doumaux | C09D 11/30 347/100 |
| 2009/0022910 A1 | 1/2009 | Teramae | |
| 2009/0233059 A1* | 9/2009 | Ota | C09D 11/322 428/195.1 |
| 2011/0223529 A1 | 9/2011 | Shimanaka et al. | |
| 2012/0050388 A1 | 3/2012 | Nishiguchi et al. | |

FOREIGN PATENT DOCUMENTS

| | | |
|---|---|---|
| EP | 2009030 A1 | 12/2008 |
| JP | 2675956 | 11/1997 |
| JP | 3534395 | 6/2004 |
| JP | 2006-169345 A | 6/2006 |
| JP | 3839829 | 11/2006 |
| JP | 4016483 | 12/2007 |
| JP | 4078679 | 4/2008 |
| JP | 2009-024162 A | 5/2009 |
| JP | 2009-191209 A | 8/2009 |
| JP | 2011-225834 A | 11/2011 |
| JP | 2011-252092 A | 12/2011 |
| JP | 2012-72354 A | 4/2012 |
| WO | WO 2004/014962 | 2/2004 |
| WO | WO 2007/119884 A1 | 10/2007 |
| WO | WO 2010/013651 | 2/2010 |

OTHER PUBLICATIONS

Otsuka Chemical Co., Ltd. Sogo Kenkyuusyo, Takahashi Kameshima,"Advanced Polymer Materials Synthesized by New Living Radical Polymerization Method", Shikizai Koenkai-Shikizai Kanren no Hitsuyo Chishiki to Saishin no Wadai, Oct. 23, 2008.

Y. Kwak et al., "Kinetic Study on Role of Ditelluride in Organotellurium-Mediated Living Radical Polymerization (TERP)" *Macromolecules* 40: 1881-1885, 2007.

Takashi Kameshima, Pertinent Section in the below Office action, dated Jul. 26, 2016.

Office Action in Japanese Patent Application No. 2013-556359, dated Jul. 26, 2016.

* cited by examiner

AQUEOUS COLORING AGENT DISPERSION FOR INKJET, INK COMPOSITION, INKJET RECORDING METHOD, AND COLORED BODY

CROSS-REFERENCE TO RELATED APPLICATIONS

This application is a continuation of U.S. patent application Ser. No. 14/374,484, filed Jul. 24, 2014, which is the U.S. National Phase under 35 U.S.C. 371 of International Application No. PCT/JP2013/051507, filed Jan. 24, 2013, which was published in Japanese as PCT WO2013/115071 on Aug. 8, 2013, which claims priority to Japanese Patent Application No. 2012-020620, filed Feb. 2, 2012, the entire content of which is incorporated herein by reference.

TECHNICAL FIELD

The present invention relates to an aqueous coloring agent dispersion for inkjet containing at least a coloring agent (I), a liquid medium (II), and a polymer dispersion agent (III), an ink composition containing the aqueous coloring agent dispersion, an inkjet recording method using the ink composition, and a colored body.

BACKGROUND ART

A recording method using an inkjet printer, which is a representative method among various color recording methods, is for performing recording by generating small ink droplets and attaching the ink droplets to a variety of record-receiving materials (paper, film, cloth, and the like). In this method, since the recording head is not brought into direct contact with the record-receiving material, less noise is generated and silent recording is achieved. In addition, since features of reduced size and increased speed are readily achievable, the inkjet recording method has been rapidly popularized in recent years. Accordingly, great advancement of the method hereafter is expected as well.

In the inkjet recording method, an ink composition prepared by dissolving coloring agents, such as various dyes or pigments, in water or water and an organic solvent, and also containing a wetting agent formed by a water-soluble organic solvent is generally used.

In the inkjet recording method, in addition to inkjet exclusive paper or glossy paper for inkjet having an ink-receiving layer, general purpose plain paper with a low water absorption capacity, and the like may be used as a record-receiving material in some cases. Such a record-receiving material does not actively include an absorbing layer and it is difficult to impregnate the ink into the record-receiving material. Therefore, drying takes a long time.

For example, in the case of high-speed automatic duplex printing in which second-face printing is carried out by instantaneously reversing a piece of paper after the first side has been printed in an inkjet recording device, a problem of contamination of reversing rollers due to undried ink may occur.

Furthermore, when a concentration of the coloring agent in the ink composition is increased in order to increase image density, it is known that the stability of the ink deteriorates. Furthermore, due to drying in the vicinity of a nozzle, the coloring agent is deposited and thus the nozzle may be clogged with the coloring agent in some cases.

Therefore, an inkjet recording method in which drying is performed rapidly even in the case of the record-receiving material having no ink-receiving layer such as plain paper, the image density is high, and the image quality is high has been desired.

There are two kinds of coloring agent which may be used in an ink for inkjet, that is, a dye and a pigment. They each are widely used as a coloring material for inkjet. In general, it is known that a dye has low endurance to light or ozone gas, and that since a dye is soluble in water, the record-receiving material after printing has low resistance to water. On the other hand, it is known that a pigment is excellent in terms of various types of resiliance to light, ozone gas, water, or the like. However, since the pigment is insoluble in water, there is a defect in that, if the pigment is dried once and then agglomerated, the pigment cannot be dispersed again in water, which is likely to result in a problem.

Hence, in order to expand the field of application of printing methods using an ink, high color development and improvement of various types of resiliance, such as light resistance and water resistance, are demanded in ink compositions for use in inkjet recording and the colored body colored with the ink composition. In addition, in the ink composition for use in inkjet recording, it is strongly demanded that the ink composition has long-term stability as an ink or the ink composition can be dissolved or dispersed in water again when the ink composition is dried.

In particular, it is demanded that a pigment ink be stable for a long period of time. It is known that, in the pigment which is not present as molecules in the ink but is generally present as particles in a dispersed state, sedimentation phenomenon temporally occurs due to agglomeration of pigment particles. Accordingly, a concentration gradient occurs in the ink and thus there is a problem in that initial printing characteristics cannot be obtained, or, in the worst case, there is a problem in that agglomerated particles are clogged at a nozzle and thus cannot be discharged.

Therefore, there is a demand for development of an ink composition in which various types of resiliance are favorable, the density of an image to be obtained by printing is high, and storage stability is favorable when the pigment is used in the ink composition. However, as the case now stands, as yet there are just a few ink compositions with sufficient performance.

As an inkjet ink composition using a pigment, an ink of Patent Document 1 is given as an example. This is an ink composition obtained by preparing a dispersion using a polymer dispersion agent. In addition, Patent Document 2 discloses an ink composition using a self-dispersion pigment.

In recent years, a microcapsule pigment using a self-assembling pigment has been widely discussed and extensively discussed as a means for solving the above-described problems. Patent Document 3 discloses a method for producing the microcapsule pigment. However, all ink compositions have not been provided as a product sufficiently satisfying a need in the market yet.

Furthermore, various types of dispersion agents have been discussed in order to obtain a coloring agent dispersion for inkjet. Patent Documents 4 and 5 each disclose a method for producing a dispersion agent using a block polymer and a method for producing dispersion using the same.

Patent Document 6 discloses a method for producing a block polymer by using an organic tellurium compound, but does not disclose the use of the polymer as a dispersion agent or application of dispersion for inkjet.

Patent Document 1: Japanese Patent No. 3534395
Patent Document 2: Japanese Patent No. 4016483
Patent Document 3: Japanese Patent No. 4078679

Patent Document 4: PCT International Application, Publication No. 2010/013651
Patent Document 5: Japanese Patent No. 2675956
Patent Document 6: Japanese Patent No. 3839829
Non-Patent Document 1: DIC Technical Review No. 10/2004

DISCLOSURE OF THE INVENTION

Problems to be Solved by the Invention

An object of the invention is intended to solve the above problems of the related art and to provide an aqueous coloring agent dispersion for inkjet which has favorable storage stability of dispersion, achieves high concentration of the coloring agent and exhibits favorable redispersion properties after drying even when used as an ink composition, and does not exhibit changes in ink properties even when stored for a long time, and an ink composition using the aqueous coloring agent dispersion.

Means for Solving the Problems

The inventors of the invention conducted thorough investigations in order to solve the problems as described above, and as a result, the inventors found that an aqueous coloring agent dispersion containing at least a coloring agent (I), a liquid medium (II), and a specific polymer dispersion agent (III), and an ink composition containing the aqueous coloring agent dispersion can solve the problems described above. Thus, the inventors completed the invention.

In other words, the invention relates to the following matters.

1) An aqueous coloring agent dispersion for inkjet containing at least a coloring agent (I), a liquid medium (II), and a polymer dispersion agent (III), in which the polymer dispersion agent (III) is an A-B block polymer obtained by copolymerizing, via a living radical polymerization method, by using as a polymerization initiator any one of a mixture of an organic tellurium compound and an organic ditellurium compound, and a mixture of the organic tellurium compound, an azo-based polymerization initiator, and the organic ditellurium compound, in which the organic tellurium compound is represented by the following formula (1):

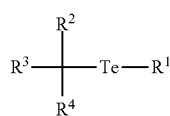

(1)

in which $R^1$ represents a $C_1$-$C_8$ alkyl group, an aryl group, a substituted aryl group, or an aromatic heterocyclic group; $R^2$ and $R^3$ represent a hydrogen atom or a $C_1$-$C_8$ alkyl group; and $R^4$ represents an aryl group, a substituted aryl group, an aromatic heterocyclic group, an acyl group, an amide group, an oxycarbonyl group, or a cyano group, and the organic ditellurium compound is represented by the following formula (2):

$(R^1Te)_2$ (2)

in which $R^1$ has the same meaning as that of $R^1$ in the above formula (1), in which A and B each mean polymers obtained by polymerizing different monomers, and the monomer for configuring the A block is one or more kinds of the monomers represented by the following formula (3):

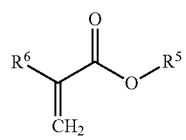

(3)

in which $R^5$ represents a hydrogen atom or an alkyl group having 4 carbon atoms which may have a branch; and $R^6$ represents a hydrogen atom or a methyl group, and the monomer for configuring the B block is benzyl methacrylate and/or benzyl acrylate.

2) The aqueous coloring agent dispersion for inkjet described in the above item 1), in which an acid value of the polymer dispersion agent (III) is 90 to 200 mgKOH/g.

3) The aqueous coloring agent dispersion for inkjet described in the above item 1) or 2), in which a mass average molecular weight of the polymer dispersion agent (III) is 10,000 to 60,000.

4) The aqueous coloring agent dispersion for inkjet described in any one of the above items 1) to 3), in which the monomer for configuring the A block is two kinds of monomer in which $R^5$ is a hydrogen atom and $R^6$ is a methyl group in the above formula (3) and a monomer in which $R^5$ is an n-butyl group and $R^6$ is a methyl group in the above formula (3).

5) The aqueous coloring agent dispersion for inkjet described in any one of the above items 1) to 4), in which the coloring agent (I) is a pigment or a disperse dye.

6) A method for producing the aqueous coloring agent dispersion for inkjet described in any one of the above items 1) to 5), the method including a process of covering the surface of the coloring agent (I) with the polymer dispersion agent (III).

7) An ink composition for inkjet recording containing the aqueous coloring agent dispersion for inkjet described in any one of the above items 1) to 5) or an aqueous coloring agent dispersion for inkjet obtained by the method described in the above item 6).

8) An inkjet recording method including: utilizing the ink composition for inkjet recording described in the above item 7) as an ink; and discharging ink droplets of the ink according to a recording signal so that recording is performed on a record-receiving material.

9) The inkjet recording method described in the above item 8), in which the record-receiving material is a communication sheet.

10) The inkjet recording method described in the above item 9), in which the communication sheet is a sheet having an ink-receiving layer containing a porous white inorganic material.

11) The inkjet recording method described in the above item 9), in which the communication sheet is a medium for recording which is subjected to a surface modification treatment selected from a corona discharge treatment, a plasma treatment, and a flame treatment.

12) A colored body colored with the ink composition for inkjet recording described in the above item 7).

13) An inkjet printer loaded with a container containing the ink composition for inkjet recording described in the above item 7).

Effects of the Invention

The aqueous coloring agent dispersion for inkjet of the present invention has favorable storage stability, and the ink composition of the present invention using the same has favorable storage stability and favorable redispersion properties. Moreover, when recording is performed on inkjet exclusive paper or general purpose plain paper, an image with a high print density is obtained. As described above, the aqueous coloring agent dispersion for inkjet of the present invention is suitably used in an ink for inkjet. Moreover, the ink composition containing the aqueous coloring agent dispersion is extremely useful as an ink for inkjet recording.

PREFERRED MODE FOR CARRYING OUT THE INVENTION

Hereinafter, the present invention will be described in detail.

The aqueous coloring agent dispersion for inkjet of the present invention contains at least a coloring agent (I), a liquid medium (II), and the specific polymer dispersion agent (III), and an ink composition containing the same is suitable for an ink for inkjet.

Furthermore, even when the ink composition contains various water-soluble organic solvents, surfactants, penetrants, and humectants, the effect of the invention can be achieved.

The coloring agent (I) in the present invention is not particularly limited, and any commonly used pigments, disperse dyes, and the like can be used. Moreover, they can be used in combination as needed.

As a pigment, mainly, there are an inorganic pigment, an organic pigment, an extender pigment, and the like. In the present invention, any pigments can be used. In addition, these pigments can be also used in combination. For example, it is also possible to prepare the aqueous coloring agent dispersion for inkjet by adding an extender pigment into the organic pigment.

Examples of the inorganic pigment include carbon blacks, metal oxides, metal hydroxides, metal sulfides, metal ferrocyanides, metal chlorides, and the like. In particular, carbon blacks are preferably used in a black aqueous ink composition. As the carbon black obtained by a thermal decomposition method, for example, thermal black and acetylene black are included. As the carbon black obtained by an incomplete combustion method, for example, oil furnace black, gas furnace black, lamp black, gas black, and channel black are included. One kind of these carbon blacks may be used or a plurality of carbon blacks may be used in combination.

As a black pigment, a carbon black pigment such as furnace black, lamp black, acetylene black, or channel black is preferable. Specific examples of the carbon black include Raven 760 ULTRA, Raven 780 ULTRA, Raven 790 ULTRA, Raven 1060 ULTRA, Raven 1080 ULTRA, Raven 1170, Raven 1190 ULTRA II, Raven 1200, Raven 1250, Raven 1255, Raven 1500, Raven 2000, Raven 2500 ULTRA, Raven 3500, Raven 5000 ULTRA II, Raven 5250, Raven 5750, or Raven 7000 (manufactured by Columbia Carbon Co., Ltd); Monarch 700, Monarch 800, Monarch 880, Monarch 900, Monarch 1000, Monarch 1100, Monarch 1300, Monarch 1400, Regal 1330R, Regal 1400R, Regal 1660R, or Mogul L (manufactured by Cabot Corporation); Color Black FW1, Color Black FW2, Color Black FW2V, Color Black FW200, Color Black 5150, Color Black S160, Color Black 5170, Printex 35, Printex U, Printex V, Printex 140U, Printex 140V, Special Black 4, Special Black 4A, Special Black 5, or Special Black 6 (manufactured by Dexa Co., Ltd.); MA7, MA8, MA100, MA600, MCF-88, No. 25, No. 33, No. 40, No. 47, No. 52, No. 900, or No. 2300 (manufactured by Mitsubishi Chemical Corporation); and the like.

Examples of the organic pigment include soluble azo pigments, insoluble azo pigments, insoluble diazo pigments, condensed azo pigments, phthalocyanine pigments, quinacridone pigments, isoindolinone pigments, dioxazine pigments, perylene pigments, perinone pigments, thioindigo pigments, anthraquinone pigments, quinophthalone pigments, and the like. One kind of these organic pigments may be used or a plurality of organic pigments may be used in combination. In addition, the above-described inorganic pigments can be also used together, and an extender pigment and the like can be also used together in order to improve flowability.

Specific examples of the organic pigment include yellow pigments such as C. I. Pigment Yellow 1, 2, 3, 12, 13, 14, 16, 17, 24, 55, 73, 74, 75, 83, 93, 94, 95, 97, 98, 108, 114, 128, 129, 138, 139, 150, 151, 154, 180, 185, 193, 199, or 202; red pigments such as C. I. Pigment Red 5, 7, 12, 48, 48:1, 57, 88, 112, 122, 123, 146, 149, 166, 168, 177, 178, 179, 184, 185, 202, 206, 207, 254, 255, 257, 260, 264, or 272; blue pigments such as C. I. Pigment Blue 1, 2, 3, 15, 15:1, 15:2, 15:3, 15:4, 15:6, 16, 22, 25, 60, 66, or 80; violet pigments such as C. I. Pigment Violet 19, 23, 29, 37, 38, or 50; orange to brown pigments such as C. I. Pigment Orange 13, 16, 68, 69, 71, or 73; green pigments such as C. I. Pigment Green 7, 36, or 54; black pigments such as C. I. Pigment Black 1; and the like.

Examples of the extender pigment include silica, calcium carbonate, talc, clay, barium sulfate, white carbon, and the like. These extender pigments are not used singly but, in general, are used in combination with an inorganic pigment or an organic pigment.

As a disperse dye, a well-known disperse dye such as an azobenzene-based disperse dye or an anthraquinone-based disperse dye may be used and one or more kinds of disperse dyes may be used for the purpose of adjusting hue.

Examples of preferable disperse dye include C. I. Disperse Yellow 9, 23, 33, 42, 49, 54, 58, 60, 64, 66, 71, 76, 79, 83, 86, 90, 93, 99, 114, 116, 119, 122, 126, 149, 160, 163, 165, 180, 183, 186, 198, 200, 211, 224, 226, 227, 231, or 237; C. I. Disperse Red 60, 73, 88, 91, 92, 111, 127, 131, 143, 145, 146, 152, 153, 154, 167, 179, 191, 192, 206, 221, 258, or 283; C. I. Disperse Orange 9, 25, 29, 30, 31, 32, 37, 38, 42, 44, 45, 53, 54, 55, 56, 61, 71, 73, 76, 80, 96, or 97; C. I. Disperse Violet 25, 27, 28, 54, 57, 60, 73, 77, 79, or 79:1; C. I. Disperse Blue 27, 56, 60, 79:1, 87, 143, 165, 165:1, 165:2, 181, 185, 197, 202, 225, 257, 266, 267, 281, 341, 353, 354, 358, 364, 365, or 368; and the like.

As the coloring agent (I), a single pigment or disperse dye may be used, or three or more kinds of an inorganic pigment, an organic pigment and/or a disperse dye may be used in combination for the purpose of adjusting the hue of an image. The adjustment of hue is carried out for the purpose of giving a graded effect to a printing article, expanding the color gamut of the printing article, and also improving stability as an ink composition. It is preferable to use two kinds or less of organic pigments in combination and it is particularly preferable to use a single organic pigment.

The amount of the coloring agent (I) added in the ink composition of the present invention is preferably used in a substantial amount of 1 to 30% by mass of the aqueous ink composition to be finally obtained, more preferably in a substantial amount of 1 to 10% by mass, and particularly preferably in a substantial amount of 2 to 7% by mass.

The liquid medium (II) in the present invention is water or an organic solvent and is a medium which maintains an aqueous coloring agent dispersion in a dispersed state in the liquid medium. Here, the organic solvent indicates a hydrophilic organic solvent or a hydrophobic organic solvent, and is preferably an organic solvent in which the aqueous coloring agent dispersion does not become two phases having an interface but becomes a dispersion state.

Specific examples of the hydrophilic organic solvent include hydrophilic alcohol compounds such as methanol (boiling point: 64° C.), ethanol (boiling point: 78° C.), 1-propanol (boiling point: 97° C.), and 2-propanol (boiling point: 82° C.); hydrophilic ether compounds such as 1,2-methoxyethane (boiling point: 93° C.), tetrahydrofuran (boiling point: 66° C.), and p-dioxane (boiling point: 101° C.); acetone (boiling point: 56° C.); acetic acid (boiling point: 118° C.); and the like. One kind of these hydrophilic organic solvents may be used or a plurality of hydrophilic organic solvents may be used in combination.

Specific examples of the hydrophobic organic solvent include aromatic hydrocarbon compounds such as benzene (boiling point: 80° C.), toluene (boiling point: 110° C.), o-xylene (boiling point: 144° C.), m-xylene (boiling point: 139° C.), and p-xylene (boiling point: 138° C.); ketone compounds sparingly soluble in water such as 2-butanone (boiling point: 79° C.), 3-pentanone (boiling point: 102° C.), and 4-methyl-2-pentanone (boiling point: 117° C.); saturated aliphatic hydrocarbon compounds such as cyclopentane (boiling point: 49° C.), pentane (boiling point: 36° C.), isopentane (boiling point: 28° C.), neopentane (boiling point: 10° C.), methylcyclopentane (boiling point: 72° C.), cyclohexane (boiling point: 81° C.), n-hexane (boiling point: 69° C.), 2-methylpentane (boiling point: 60° C.), 3-methylpentane (boiling point: 63° C.), 2,2-dimethylbutane (boiling point: 50° C.), 2,3-dimethylbutane (boiling point: 58° C.), methylcyclohexane (boiling point: 101° C.), heptane (boiling point: 98° C.), 2-methylhexane (boiling point: 90° C.), 3-methylhexane (boiling point: 92° C.), 2,3-dimethylpentane (boiling point: 90° C.), 2,4-dimethylpentane (boiling point: 81° C.), and ethylcyclohexane (boiling point: 131° C.); alcohol compounds sparingly soluble in water such as 1-butanol (boiling point: 118° C.), 2-butanol (boiling point: 100° C.), 2-methyl-1-propanol (boiling point: 108° C.), and 1-pentanol (boiling point: 138° C.); ether compounds sparingly soluble in water such as ethyl ether (boiling point: 35° C.), propyl ether (boiling point: 89° C.), isopropyl ether (boiling point: 68° C.), butylethyl ether (boiling point: 92° C.), 1,2 epoxybutane (boiling point: 63° C.), and tetrahydropyran (boiling point: 88° C.); ester compounds such as methyl acetate (boiling point: 56° C.), ethyl acetate (boiling point: 77° C.), propyl acetate (boiling point: 102° C.), and isopropyl acetate (boiling point: 88° C.); halogen compounds such as chloroethane (boiling point: 12° C.), 1-chloropropane (boiling point: 47° C.), 2-chloropropane (boiling point: 35° C.), 1-chlorobutane (boiling point: 78° C.), 2-chlorobutane (boiling point: 68° C.), dichloromethane (boiling point: 40° C.), chloroform (boiling point: 61° C.), carbon tetrachloride (boiling point: 77° C.), 1,1-dichloroethane (boiling point: 57° C.), and 1,1,1-trichloroethane (boiling point: 74° C.); and the like. One kind of these hydrophobic organic solvents may be used or a plurality of hydrophobic organic solvents may be used in combination.

The hydrophobic organic solvent is generally insoluble in water. However, the hydrophobic organic solvent is soluble in a solution having a surfactant ability and thus can be used as a liquid medium. In the present invention, in a state where an aqueous coloring agent dispersion is dispersed, the hydrophobic organic solvent can be used as long as it is not separated from water to become two phases.

Water is most preferable as the liquid medium (II) used in the present invention. The hydrophilic organic solvent or the hydrophobic organic solvent is included preferably in an amount of 10% by mass or less and more preferably in an amount of 1% by mass or less based on the total mass of the aqueous coloring agent dispersion, or the hydrophilic organic solvent or the hydrophobic organic solvent may not be included.

As a technique of stabilizing the coloring agent dispersion in water, a method is used in which the coloring agent dispersion is stabilized in water by generally using a polymer dispersion agent such as a resin, due to entropic or ionic repulsion, or stereoscopic repulsion. Here, the polymer dispersion agent indicates a polymer which has a hydrophilic moiety and a hydrophobic moiety and in which the hydrophobic moiety functions to be adsorbed onto the surface of the coloring agent and the hydrophilic moiety functions to be dispersed or dissolved in a liquid medium.

Representative examples of the resin which is useful for the above purpose include ionic monomers such as an α,β-unsaturated monomer of, for example, polyvinyl alcohol, cellulose-based derivatives, polyethylene oxide, polypropylene oxide, acrylic acid, methacrylic acid, crotonic acid, itaconic acid, itaconic acid monoesters, maleic acid, maleate monoesters, fumaric acid, fumarate monoesters, vinyl sulfonic acid, sulfoethyl methacrylate, sulfopropyl methacrylate, or sulfonated vinylnaphthalene; polymers derived from, for example, styrene, styrene derivatives, vinylnaphthalene, vinylnaphthalene derivatives, aliphatic alcohol esters of α,β-ethylenic unsaturated carboxylate, acrylonitrile, vinylidene chloride, vinyl acetate, vinyl chloride, acrylamide, methacrylamide, hydroxyethyl methacrylate, hydroxypropyl methacrylate, glycidyl methacrylate, and N-butoxy methylacrylamide; and the like.

The polymer dispersion agent (III) in the present invention is an A-B block polymer obtained by copolymerizing, via a living radical polymerization method, by using any one of a mixture of an organic tellurium compound represented by the above formula (1) and an organic ditellurium compound represented by the above formula (2), and a mixture of the organic tellurium compound represented by the above formula (1), an azo-based polymerization initiator, and the organic ditellurium compound represented by the above formula (2), as a polymerization initiator. Incidentally, the A-B block polymer means a polymer obtained by chemically bonding the A polymer and the B polymer, and A and B each mean polymers obtained by polymerizing different monomers.

In the above formula (1), $R^1$ represents a $C_1$-$C_8$ alkyl group, an aryl group, a substituted aryl group, or an aromatic heterocyclic group. $R^2$ and $R^3$ represent a hydrogen atom or a $C_1$-$C_8$ alkyl group. $R^4$ represents an aryl group, a substituted aryl group, an aromatic heterocyclic group, an acyl group, an amide group, an oxycarbonyl group, or a cyano group.

In the above formula (1), examples of the $C_1$-$C_8$ alkyl group in $R^1$ include linear, branched, or cyclic alkyl groups having 1 to 8 carbon atoms such as a methyl group, an ethyl group, an n-propyl group, an isopropyl group, a cyclopropyl group, an n-butyl group, a sec-butyl group, a tert-butyl group, a cyclobutyl group, an n-pentyl group, an n-hexyl group, an n-heptyl group, and an n-octyl group. Preferably, a linear or branched alkyl group having 1 to 4 carbon atoms is exemplified and, more preferably, a methyl group, an ethyl group, or an n-butyl group is exemplified.

Examples of the aryl group include a phenyl group, a naphthyl group, and the like. Preferably, a phenyl group is exemplified.

In addition, examples of the substituted aryl group can include a phenyl group having a substituent, a naphthyl group having a substituent, and the like. Examples of the substituent can include a halogen atom, a hydroxyl group, an alkoxy group, an amino group, a nitro group, a cyano group, a carbonyl-containing group represented by —CORa (Ra=an alkyl group having 1 to 8 carbon atoms, an aryl group, an alkoxy group having 1 to 8 carbon atoms, and an aryloxy group), a sulfonyl group, a trifluoromethyl group, and the like. Preferably, a trifluoromethyl-substituted phenyl group may be exemplified. The number of these substituents is preferably one or two, and a substitution position is preferably a para position and/or an ortho position.

Moreover, examples of the aromatic heterocyclic group can include a pyridyl group, a pyrrole group, a furyl group, a thienyl group, and the like.

In the above formula (1), the same as the alkyl group represented by $R^1$ can be exemplified as an example of the $C_1$-$C_8$ alkyl group in $R^2$ or $R^3$.

In the above formula (1), examples of the aryl group, the substituted aryl group, and the aromatic heterocyclic group in $R^4$ can include the same group as each group represented by $R^1$ in the above formula (1).

Examples of the acyl group can include a formyl group, an acetyl group, a benzoyl group, and the like.

Examples of the amide group can include carboxylic amides such as acetamide, malonamide, succinamide, maleamide, benzamide, and 2-furamide; thioamides such as thioacetamide, hexane dithioamide, thiobenzamide, and methane thiosulfonamide; selenoamides such as selenoacetamide, hexane diselenoamide, selenobenzamide, and methane selenosulfonamide; N-substituted amides such as N-methyl acetamide, benzanilide, cyclohexane carboxanilide, and 2,4'-dichloroacetanilide; and the like.

As the oxycarbonyl group, a group represented by —CO-ORb (Rb=H, an alkyl group having 1 to 8 carbon atoms, and an aryl group) may be exemplified. Specific examples thereof can include a carboxy group, a methoxycarbonyl group, an ethoxycarbonyl group, a propoxycarbonyl group, an n-butoxycarbonyl group, a sec-butoxycarbonyl group, a tert-butoxycarbonyl group, an n-pentoxycarbonyl group, a phenoxycarbonyl group, and the like. Among them, preferably, a methoxycarbonyl group and an ethoxycarbonyl group are exemplified.

In the above formula (1), a preferable organic tellurium compound is a compound in which $R^1$ represents an alkyl group having 1 to 4 carbon atoms, $R^2$ and $R^3$ represent a hydrogen atom or an alkyl group having 1 to 4 carbon atoms, and $R^4$ represents an aryl group, a substituted aryl group, or an oxycarbonyl group.

A particularly preferable organic tellurium compound is a compound in which $R^1$ represents an alkyl group having 1 to 4 carbon atoms, $R^2$ and $R^3$ represent a hydrogen atom or an alkyl group having 1 to 4 carbon atoms, and $R^4$ represents a phenyl group, a substituted phenyl group, a methoxycarbonyl group, or an ethoxycarbonyl group.

Representative specific examples of the organic tellurium compound can include (methyltellanyl methyl)benzene, (1-methyltellanyl ethyl)benzene, 1-chloro-4-(1-methyltellanyl ethyl)benzene, 1-trifluoromethyl-4-(1-methyltellanyl ethyl)benzene, 3,5-bis-trifluoromethyl-1-(1-methyltellanyl ethyl)benzene, 1,2,3,4,5-pentafluoro-6-(1-methyltellanyl ethyl)benzene, 2-methyltellanyl propionitrile, (2-methyltellanyl propyl)benzene, methyl 2-methyltellanyl-2-methyl-propionate, ethyl 2-methyltellanyl-2-methyl-propionate, 2-methyltellanyl-2-methyl-propionitrile, and the like. In addition, with regard to the above description, a compound in which the moiety of methyltellanyl is changed with ethyltellanyl, n-butyltellanyl, n-octyltellanyl, or the like can be exemplified. As other examples, all organic tellurium compounds described in WO 2004/014962 A (line 25 on page 4 to line 18 on page 7) can be exemplified.

By appropriately adjusting the amount of the organic tellurium compound used, it is possible to obtain a polymer having a target number average molecular weight. The preferable amount used is generally a value (the unit of the amount used is molar number) obtained by dividing the mass (the unit is gram) of a vinyl monomer as a raw material by the target number average molecular weight of the polymer. The amount, which is about 0.3 time to 3 times the value, is preferably used depending on the occasion.

Incidentally, depending on the types of the vinyl-based monomer to be polymerized, the organic ditellurium compound represented by the above formula (2) may also be added in addition to the organic tellurium compound represented by the above formula (1) used as the polymerization initiator.

Specific examples of the organic ditellurium compound include dimethyl ditelluride, diethyl ditelluride, di-n-propyl ditelluride, diisopropyl ditelluride, dicyclopropyl ditelluride, di-n-butyl ditelluride, di-sec-butyl ditelluride, di-tert-butyl telluride, dicyclobutyl telluride, diphenyl ditelluride, bis-(p-methoxyphenyl) ditelluride, bis-(p-aminophenyl) ditelluride, bis-(p-nitrophenyl) ditelluride, bis-(p-cyanophenyl) ditelluride, bis-(p-sulfonylphenyl) ditelluride, dinaphthyl ditelluride, dipyridyl ditelluride, and the like.

Dimethyl ditelluride, diethyl ditelluride, di-n-propyl ditelluride, di-n-butyl ditelluride, and diphenyl ditelluride are preferable.

Dimethyl ditelluride, diethyl ditelluride, di-n-propyl ditelluride, and di-n-butyl ditelluride are particularly preferable.

In the case when the organic ditellurium compound represented by the above formula (2) is used, it is desirable that the organic ditellurium compound be used at a ratio of preferably 0.01 to 100 mol, more preferably 0.1 to 10 mol, and still more preferably 0.1 to 5 mol with respect to 1 mol of the organic tellurium compound represented by the above formula (1) used as the polymerization initiator.

An azo-based polymerization initiator may be used in addition to the organic tellurium compound and the organic ditellurium compound as the polymerization initiator which is used in the polymerization process in the invention. Although not particularly limited as long as it is an initiator used in general radical polymerization, examples of the azo-based polymerization initiator include 2,2'-azobis (isobutyronitrile) (AIBN), 2,2'-azobis(2-methylbutyronitrile) (AMBN), 2,2'-azobis(2,4-dimethylvaleronitrile) (ADVN), 1,1'-azobis(1-cyclohexanecarbonitrile) (ACHN), dimethyl-2,2'-azobisisobutyrate (MAIB), 4,4'-azobis(4-cyanovaleric acid) (ACVA), 1,1'-azobis(1-acetoxy-1-phenylethane), 2,2'-azobis(2-methylbutylamide), 2,2'-azobis(4-methoxy-2,4-dimethylvaleronitrile), 2,2'-azobis(2-methylamidinopropane) dihydrochloride, 2,2'-azobis[2-(2- imidazolin-2-yl)propane], 2,2'-azobis[2-methyl-N-(2-hydroxyethyl)propionamide], 2,2'-azobis(2,4,4-trimethylpentane), 2-cyano-2-propylazoformamide, 2,2'-azobis(N-butyl-2-methylpropionamide), 2,2'-azobis(N-cyclohexyl-2-methylpropionamide), and the like.

It is preferable to appropriately select these azo-based polymerization initiators depending on the reaction conditions.

For example, it is preferable to use 2,2'-azobis(2,4-dimethylvaleronitrile) (ADVN) or 2,2'-azobis(4-methoxy-2,4-dimethylvaleronitrile) in the case of low-temperature polymerization (40° C. or lower), 2,2'-azobis(isobutyronitrile) (AIBN), 2,2'-azobis(2-methylbutyronitrile) (AMBN), dimethyl-2,2'-azobisisobutyrate (MAIB), or 1,1'-azobis(1-acetoxy-1-phenylethane) in the case of moderate-temperature polymerization (40 to 80° C.), or 1,1'-azobis(1-cyclohexanecarbonitrile) (ACHN), 2-cyano-2-propylazoformamide, 2,2'-azobis(N-butyl-2-methylpropionamide), 2,2'-azobis(N-cyclohexyl-2-methylpropionamide), or 2,2'-azobis(2,4,4-trimethylpentane) in the case of high-temperature polymerization (80° C. or higher).

In addition, in the reaction using an aqueous solvent, it is preferable to use 4,4'-azobis(4-cyanovaleric acid) (ACVA), 2,2'-azobis(2-methylbutylamide), 2,2'-azobis(2-methylamidinopropane) dihydrochloride, 2,2'-azobis[2-(2-imidazolin-2-yl)propane], or 2,2'-azobis[2-methyl-N-(2-hydroxyethyl)propionamide].

In the case when the azo-based polymerization initiator is used, it is desirable that the azo-based polymerization initiator be used at a ratio of preferably 0.01 to 100 mol, more preferably 0.1 to 10 mol, and still more preferably 0.1 to 5 mol with respect to 1 mol of the organic tellurium compound of the above formula (1) used as the polymerization initiator.

In the case when the polymer dispersion agent (III) is prepared using any one of the mixture of the organic tellurium compound represented by the above formula (1) and the organic ditellurium compound represented by the above formula (2) and the mixture of the organic tellurium compound represented by the above formula (1), the azo-based polymerization initiator, and organic ditellurium compound represented by the above formula (2) as the polymerization initiator, it is characterized in that the organic tellurium compound is included in the polymer dispersion agent (III) component. The total amount of tellurium in the dispersion agent can be measured by using a well-known metal measuring method such as an ICP emission analysis method or an atomic absorption method.

Furthermore, in the invention, the monomer for configuring the A polymer is the monomer represented by the above formula (3), and the monomer for configuring the B polymer is benzyl methacrylate and/or benzyl acrylate. In the formula (3), $R^5$ represents a hydrogen atom or an alkyl group having 4 carbon atoms which may have a branch, and $R^6$ represents a hydrogen atom or a methyl group. In addition, it is preferable to use a monomer in which $R^5$ is a hydrogen atom and $R^6$ is a methyl group, or a monomer in which $R^5$ is an n-butyl group and $R^6$ is a methyl group. The case in which these two kinds of monomer are used in combination is a particularly preferable aspect. It is preferable that the monomer for configuring the B polymer be one or more kinds of monomers selected from benzyl methacrylate and benzyl acrylate, and more preferably benzyl methacrylate.

Furthermore, the acid value of the polymer dispersion agent (III) is preferably 90 to 200 mgKOH/g. The acid value of the polymer dispersion agent (III) is more preferably 100 to 150 mgKOH/g and most preferably 100 to 120 mgKOH/g. When the acid value is too small, the problem that solubility to water or a liquid medium is lowered occurs. On the other hand, when the acid value is too large, color development may be lowered in some cases.

The mass average molecular weight of the polymer dispersion agent (III) is preferably 10,000 to 60,000. The mass average molecular weight of the polymer dispersion agent (III) is more preferably 10,000 to 40,000 and most preferably 15,000 to 30,000. When the mass average molecular weight is too small, the stability of the dispersion is lowered. On the other hand, the same is true in the case when the mass average molecular weight is too large.

The amount of the polymer dispersion agent (III) to be used is expressed as a numerical value generally called a division ratio. The division ratio can be calculated by the following equation.

Division Ratio=Mass of Polymer Dispersion Agent (III)/Mass of Coloring agent (I)

In the invention, the division ratio is preferably 0.1 to 1.0, more preferably 0.1 to 0.6, and most preferably 0.2 to 0.4. When the division ratio is too small, the stability of the dispersion may be lowered or the image of the printed article may be deteriorated in some cases. On the other hand, the same is true of the case when the division ratio is too large.

In the aqueous coloring agent dispersion of the present invention, it is necessary to use a neutralizing agent in order to dissolve a pigment dispersed substance using the polymer dispersion agent (III) in water. Examples of the neutralizing agent include a hydroxide of alkali metal, a hydroxide of alkaline-earth metal, an aliphatic amine compound, an alcohol amine compound, and the like.

Examples of the hydroxide of alkali metal include lithium hydroxide, sodium hydroxide, potassium hydroxide, and the like. Examples of the hydroxide of alkaline-earth metal include beryllium hydroxide, magnesium hydroxide, calcium hydroxide, strontium hydroxide, and the like. The hydroxide of alkaline-earth metal is preferable, and lithium hydroxide and sodium hydroxide are more preferable.

Examples of the alcohol amine compound include monoethanolamine, diethanolamine, triethanolamine, monopropanolamine, dipropanolamine, tripropanolamine, methylethanolamine, dimethylethanolamine, N-methyldiethanolamine, and the like. Tertiary amines are preferable and triethanolamine is more preferable.

Examples of the aliphatic amine compound include ammonia, monomethylamine, dimethylamine, trimethylamine, monoethylamine, dimethylamine, and trimethylamine. Ammonia or triethylamine is preferable.

One kind of these neutralizing agents may be used or a plurality of neutralizing agents may be used in combination.

In the aqueous coloring agent dispersion of the present invention, the neutralizing agent can be used in a desired amount. The case of neutralization based on the theoretical equivalent of the acid value of the polymer dispersion agent (III) corresponds to 100% of the degree of neutralization. The neutralizing agent may be used in an amount exceeding the theoretical amount. The degree of neutralization is preferably 50 to 200%, more preferably 80 to 150%, and most preferably 100 to 120%.

In the aqueous coloring agent dispersion of the present invention, in the case when the polymer dispersion agent having an acid value exceeding 200 mgKOH/g is used, when a degree of neutralization lower than 100% degree of neutralization is used, the same performance as in the case of using the dispersion agent having a low acid value may be obtained in some cases.

The aqueous coloring agent dispersion of the present invention may be a microencapsulated pigment obtained by covering the surface of the coloring agent (I) with the polymer dispersion agent (III) or may not be microencapsulated, but it is preferable to use a microencapsulated pigment obtained by uniformly covering the surface of the pigment with the polymer dispersion agent (III).

The techniques of uniformly covering the surface of the coloring agent with the polymer dispersion agent (III) are largely classified into two methods, a physical and mechanical technique and a chemical technique. In the latter chemical technique, a surface deposition method, a kneading method, an interfacial polymerization method, and the like are proposed. Non-Patent Document 1 specifically discloses the performance of a microencapsulated pigment. Here, the surface deposition method is a technique of depositing a polymer dispersion agent onto the surface of the pigment by pH adjustment or with the use of a difference in solubility to a medium, and an acid precipitation method, a phase inversion emulsification method, or the like is included. The interfacial polymerization method is a technique in which a monomer, an oligomer, and a pigment derivate are caused to be adsorbed to the surface of the pigment and then the polymerization reaction is carried out, and is also called a surface polymerization method. In the present invention, any technique may be used, but the surface deposition method is preferably used. A coloring agent dispersion obtained by the phase inversion emulsification method is more preferably used.

The phase inversion emulsification method is a technique in which the dispersion agent is uniformly adsorbed on the surface of the pigment by mixing and dispersing the dispersion agent and the coloring agent in the organic solvent, and then adding water thereto. The following five types of production methods are known as a specific production method.

1. A production method in which a solution, in which the coloring agent (I) is dispersed, of a hydrophilic organic solvent of a dispersion agent which can disperse or dissolve in water, and a liquid including water as a main component are mixed, followed by the solvent removal.

2. A production method in which a solution, in which the coloring agent (I) is dispersed, of a hydrophilic organic solvent of a dispersion agent which can disperse or dissolve in water through neutralization, and a mixed liquid containing water and a neutralizing agent are mixed, followed by the solvent removal.

3. A production method in which a mixed solution, in which the coloring agent (I) is dispersed, of a hydrophilic organic solvent of a dispersion agent which can disperse or dissolve in water and a hydrophobic organic solvent, and a liquid including water as a main component are mixed, followed by the solvent removal.

4. A production method in which a mixed solvent solution, in which the coloring agent (I) is dispersed, of a hydrophilic organic solvent of a dispersion agent which can disperse or dissolve in water through neutralization and a hydrophobic organic solvent, and a mixed liquid containing water and a neutralizing agent are mixed, followed by the solvent removal.

5. A production method in which the coloring agent (I) and a mixed solvent solution, which includes a hydrophilic organic solvent of a dispersion agent which can disperse or dissolve in water and water as main components, are mixed and a pigment is dispersed in the solution, followed by the solvent removal.

The aqueous dispersion of the invention can be also obtained by the above-described production methods, but it is also possible to obtain covered coloring agent dispersion by a different method. As the different method, a production method is provided in which a solution of a hydrophobic organic solvent dissolved with the polymer dispersion agent (III) and a liquid containing a neutralizing agent and including water as a main component are mixed to obtain an emulsified liquid (emulsion or microemulsion), the coloring agent (I) is added thereto to be dispersed, and then water is also added thereto, followed by the solvent removal.

The particles of the coloring agent, the surface of which is covered with the polymer dispersion agent (III), have been described in detail, but it is possible to easily obtain particles of the coloring agent, using the above method, which have the polymer dispersion agent (III) on the surface and have an average particle diameter of 200 nm or less. In particular, the average particle diameter thereof is set to be more preferably 50 to 150 nm and particularly preferably 60 to 120 nm, depending on the selection of the kinds of the coloring agent (I) or the kinds of the polymer dispersion agent (III) to be used, the value of the corresponding acid value, the corresponding molecular weight, or the like. According to this, it is possible to obtain an ink composition for inkjet recording which is excellent in terms of dispersing stability and discharging stability and is capable of increasing the print density of an image, and to obtain a colored body obtained by using the ink composition. Here, the term "average particle diameter" used in this specification means the average particle diameter of particles measured by using a laser light scattering method.

As a method of dispersing the pigment, a method using a sand mill (beads mill), a roll mill, a ball mill, a paint shaker, an ultrasonic disperser, a microfluidizer, or the like may be exemplified. Among them, a sand mill (beads mill) is preferably used. In addition, it is desirable that preparation of the pigment dispersion using a sand mill (beads mill) be carried out under the condition of increased dispersing efficiency by, for example, using beads having a small diameter (diameter of 0.01 to 1 mm) and increasing the bead filling rate.

By carrying out dispersion under such a condition, the particle size of the coloring agent (I) can be reduced, and thus a dispersion having favorable dispersibility can be obtained. Furthermore, after preparation of the dispersion, components such as pigments having a large particle size may be preferably removed by filtration and/or centrifugal separation. Furthermore, for the purpose of suppressing bubbling and the like at the time of preparing the dispersion, a defoaming agent such as a silicone-based or acetylene glycol-based defoaming agent, which is described above, may be added in a trace quantity. Here, as a defoaming agent, since there is a defoaming agent inhibiting dispersion or microparticulation, it is preferable to use a defoaming agent which does not have influence on dispersion or stability after dispersion.

The ink composition of the present invention will be described in detail. As a component other than the coloring agent (I), the liquid medium (II), and the polymer dispersion agent (III), a water-soluble organic solvent may be contained in the total mass of the ink composition of the present invention, for example, in an amount of 0 to 50% by mass, an ink preparation agent may be contained in it, for example, in an amount of 0 to 30% by mass, and the balance is water.

A pH of the ink composition of the present invention is preferably pH 5 to 11 and more preferably pH 7 to 10 for the purpose of improving storage stability. Furthermore, the surface tension of the ink composition is preferably 10 to 50 mN/m and more preferably 20 to 40 mN/m. Furthermore, the viscosity of the ink composition is preferably 30 mPa·s or less and more preferably 20 mPa·s or less. The pH and the surface tension of the ink composition of the present invention can be appropriately adjusted by using a pH-adjusting agent or a surfactant as will be described later.

The ink composition of the present invention is prepared by dissolving the aqueous coloring agent dispersion for inkjet in water or a water-soluble organic solvent (organic solvent that is miscible with water), and adding thereto an ink preparation agent as needed. In the case when the ink composition is used as an ink for inkjet recording, one having an inorganic impurities content such as metal cation chlorides (for example, sodium chloride) and sulfuric acid salts (for example, sodium sulfate) in the aqueous coloring agent dispersion contained in the ink composition of the present invention as low as possible is preferably used. The reference standard of the content of the inorganic impurities is approximately about 1% by mass or less with respect to the total mass of the coloring agent, and the lower limit may be no greater than the detection limit of an analytical instrument, that is, may be 0%. A desalting treatment may be carried out for producing the coloring agent having a low inorganic impurity content by, for example, a method with a reverse osmosis membrane; a method in which the dried matter or wet cake of the coloring agent is stirred in a mixed solvent of an (C1-C4) alcohol such as methanol with water, and separating the deposited matter by filtration, followed by drying; or a method in which inorganic impurities are subjected to exchange adsorption by an ion exchange resin.

Specific examples of the water-soluble organic solvent, which may be used in the preparation of the ink composition, include (C1-C6) alkanols such as methanol, ethanol, propanol, isopropanol, butanol, isobutanol, secondary butanol, tertiary butanol, 1,2-hexanediol, 1,6-hexanediol, and trimethylolpropane; carboxylic amides such as N,N-dimethylformamide and N,N-dimethylacetamide; lactams such as 2-pyrrolidone, N-methyl-2-pyrrolidone, and N-methylpyrrolidin-2-one; cyclic ureas such as 1,3-dimethylimidazolidin-2-one, and 1,3-dimethyl hexahydropyrimid-2-one; ketones or keto-alcohols such as acetone, 2-methyl-2-hydroxypentan-4-one, and ethylene carbonate; cyclic ethers such as tetrahydrofuran and dioxane; mono-, oligo-, or poly-alkylene glycols, or thioglycols having C2-C6 alkylene units such as ethylene glycol, diethylene glycol, 1,2-propylene glycol, 1,3-propylene glycol, 1,2-butylene glycol, 1,4-butylene glycol, 1,6-hexylene glycol, diethylene glycol, triethylene glycol, tetraethylene glycol, dipropylene glycol, polyethylene glycol, polypropylene glycol, thiodiglycol, and dithiodiglycol; polyols (triols) such as glycerin, diglycerin, and hexane-1,2,6-triol; (C1-C4) alkyl ethers of polyhydric alcohol such as ethylene glycol monomethyl ether, ethylene glycol monoethyl ether, diethylene glycol monoethyl ether, diethylene glycol monobutyl ether (butyl carbitol), triethylene glycol monomethyl ether, triethylene glycol monoethyl ether, and triethylene glycol monobutyl ether; γ-butyrolactones and dimethylsulfoxides; polyethylene glycols having a molecular weight of 400, 800, 1540, or more; and the like. One kind of these organic solvents may be used alone, or two or more kinds thereof may be used in combination.

Among these organic solvents, isopropanol, N-methyl-2-pyrrolidone, glycerin, and butyl carbitol are preferable.

Examples of the ink preparation agent, which is preferably used in the preparation of the ink composition of the present invention, include fungicides/preservatives, pH-adjusting agents, chelating reagents, rust-preventive agents, water-soluble ultraviolet light absorbing agents, water-soluble polymer compounds, antioxidizing agents, surfactants, and the like. Hereinafter, these ink preparation agents will be described.

Specific examples of the fungicides include sodium dehydroacetate, sodium benzoate, sodium pyridinethione-1-oxide, ethyl p-hydroxybenzoate, 1,2-benzisothiazolin-3-one, salts thereof, and the like.

Specific examples of the preservatives include organic sulfur-based, organic nitrogen sulfur-based, organic halogen-based, haloallyl sulfone-based, iodopropargyl-based, haloalkylthio-based, nitrile-based, pyridine-based, 8-oxyquinoline-based, benzothiazole-based, isothiazoline-based, dithiol-based, pyridineoxide-based, nitropropane-based, organic tin-based, phenol-based, quaternary ammonium salt-based, triazine-based, thiazine-based, anilide-based, adamantane-based, dithiocarbamate-based, brominated indanone-based, benzylbromoacetate-based, inorganic salt-based compounds, and the like. Specific examples of the organic halogen-based compound include sodium pentachlorophenol. Specific examples of the pyridineoxide-based compound include sodium 2-pyridinethiol-1-oxide. Specific examples of the isothiazoline-based compound include 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, 2-methyl-4-isothiazolin-3-one calcium chloride, and the like. Other specific examples of the fungicides/preservatives include anhydrous sodium acetate, sodium sorbate, sodium benzoate, trade names Proxel® GXL(S) and Proxel® XL-2(S) manufactured by Arch Chemical, Inc., and the like. Incidentally, in this specification, the superscript notation of "RTM" means a registered trademark.

An arbitrary substance may be used as the pH-adjusting agents as long as the pH of the ink can be controlled to be in a range of, for example, 5 to 11 without adversely affecting the ink to be prepared. Specific examples of the pH-adjusting agents include alkanolamines such as diethanolamine, triethanolamine, and N-methyldiethanolamine; hydroxides of alkali metal such as lithium hydroxide, sodium hydroxide, and potassium hydroxide; ammonium hydroxide (aqueous ammonia); carbonates of alkali metal such as lithium carbonate, sodium carbonate, sodium hydrogen carbonate, and potassium carbonate; alkali metal salts of organic acid such as sodium silicate and potassium acetate; inorganic salts such as disodium phosphate; and the like.

Specific examples of the chelating reagents include disodium ethylenediamine tetraacetate, sodium nitrilo triacetate, sodium hydroxyethylethylenediamine triacetate, sodium diethylenetriamine pentaacetate, sodium uracil diacetate, and the like.

Specific examples of the rust-preventive agents include acidic sulfite, sodium thiosulfate, ammonium thioglycolate, diisopropylammonium nitrite, pentaerythritol tetranitrate, dicyclohexylammonium nitrite, and the like.

Specific examples of the water-soluble ultraviolet light absorbing agents include sulfonated benzophenone-based compounds, benzotriazole-based compounds, salicylic acid-based compounds, cinnamic acid-based compounds, and triazine-based compounds.

Specific examples of the water-soluble polymer compounds include polyethylene glycol, polyvinyl alcohol, cellulose derivatives, polyamine, polyimine, and the like.

Various organic and metal complex-based discoloration-preventive agents can be used, for example, as specific examples of the antioxidizing agents. Examples of the organic discoloration-preventive agents include hydroquinones, alkoxyphenols, dialkoxyphenols, phenols, anilines, amines, indanes, chromanes, alkoxyanilines, heterocycles, and the like.

Examples of the surfactants include well-known surfactants such as anionic surfactants, cationic surfactants, and nonionic surfactants.

Examples of the anionic surfactants include alkylsulfocarboxylic acid salts, α-olefinsulfonic acid salts, polyoxyethylenealkyl ether acetic acid salts, N-acylamino acid or salts thereof, N-acylmethyltaurine salts, alkylsulfate polyoxyalkyl ether sulfuric acid salts, alkylsulfate polyoxyethylenealkyl ether phosphoric acid salts, rosin acid soap, castor oil sulfate ester salts, lauryl alcohol sulfate ester salts, alkylphenolic phosphate esters, alkylated phosphate esters, alkylarylsulfonic acid salts, diethyl sulfosuccinic acid salts, diethylhexyl sulfosuccinic acid salts, dioctyl sulfosuccinic acid salts, and the like.

Examples of the cationic surfactants include 2-vinylpyridine derivatives, poly(4-vinylpyridine) derivatives, and the like.

Examples of the amphoteric surfactants include lauryldimethylamino acetate betaine, 2-alkyl-N-carboxymethyl-N-hydroxyethylimidazolinium betaine, coconut oil fatty acid amide propyldimethylamino acetate betaine, polyoctylpolyaminoethylglycine, imidazoline derivatives, and the like.

Examples of the nonionic surfactants include ether-based surfactants such as polyoxyethylene nonylphenyl ether, polyoxyethylene octylphenyl ether, polyoxyethylene dodecylphenyl ether, polyoxyethylene oleyl ether, polyoxyethylene lauryl ether, and polyoxyethylene alkyl ether; ester-based surfactants such as polyoxyethylene oleate esters, polyoxyethylene distearate esters, sorbitan laurate, sorbitan monostearate, sorbitan monooleate, sorbitan sesquioleate, polyoxyethylene monooleate, and polyoxyethylene stearate; acetylene glycol (alcohol)-based surfactants such as 2,4,7,9-tetramethyl-5-decyne-4,7-diol, 3,6-dimethyl-4-octyne-3,6-diol, and 3,5-dimethyl-1-hexyn-3-ol; trade names Surfynol® 104, 105PG50, 82, 420, 440, 465, 485, and Olfin® STG manufactured by Nissin Chemical Co., Ltd.; polyglycol ether-based surfactants (for examples, Tergltol® 15-S-7 manufactured by Sigma-Aldrich Co.); and the like.

The above-described ink preparation agents may be used either alone or as a mixture. Surfynol-based surfactants are preferable and Surfynol® 104 PG50, Surfynol® 440, and Surfynol® 465 are more preferable.

The ink composition of the present invention can be used in various fields, but is suitable for aqueous writing inks, aqueous printing inks, information recording inks, textile printing, and the like. It is particularly preferable to use the ink composition as an ink for inkjet recording, and the ink composition is suitably used in the inkjet recording method of the present invention which will be described later.

The inkjet recording method of the present invention will be described. The inkjet recording method of the present invention is a method of using the ink composition of the present invention as an ink, performing recording by discharging droplets of the ink according to the recording signals, and attaching the ink droplets to the record-receiving material. There are no particular limitation on ink nozzles and the like which are used at the time of recording, and these may be appropriately selected according to the purpose.

This recording method can be carried out by employing a well-known method, for example, a charge-control system that discharges ink by utilizing an electrostatic attraction force; a drop-on-demand system (pressure pulse system) that utilizes the vibration pressure of a piezoelectric element; an acoustic inkjet system that converts electrical signals into acoustic beams, irradiates ink with the beams, and discharges the ink by utilizing radiation pressure; and a thermal inkjet, that is, BUBBLEJET (registered trademark) system, that heats ink to form bubbles and utilizes the pressure resulting therefrom. It is to be noted that the inkjet recording method also includes a system in which an ink having a low coloring matter concentration (coloring matter content) in the ink referred to as photo ink is ejected in a large number of droplets having a small volume; a system in which a plurality of inks having substantially the same hue and different coloring matter concentration in the ink are used to improve the image quality; a system in which a colorless transparent ink is used; and the like.

The colored body of the present invention is a substance colored with the ink composition of the present invention. It is preferable to use a record-receiving material colored with the ink composition of the present invention by an inkjet recording method using an inkjet printer. The record-receiving material to be colored is not particularly limited, and, for example, a communication sheet such as paper or film, and a fiber or cloth (cellulose, nylon, wool, and the like), leather, a base material for a color filter and the like are exemplified. Among them, a communication sheet is preferable.

As the communication sheet, paper subjected to a surface treatment may be used, and specifically, a base material, such as paper, synthetic paper, and a film, provided with an ink-receiving layer may be used. The ink-receiving layer is provided by, for example, a method in which a cationic polymer is impregnated in or coated on the above-described base material; a method in which inorganic fine particles that can absorb a coloring matter, such as porous silica, alumina sol, or special ceramics, in an ink are coated on the surface of the above-described base material together with a hydrophilic polymer such as polyvinyl alcohol or polyvinylpyrrolidone. Such communication sheets provided with an ink receiving layer are generally called exclusive inkjet paper, an exclusive inkjet film, glossy paper, a gloss film, and the like.

Among the above-described communication sheets, a sheet coated with a porous white inorganic material on the surface thereof has high surface glossiness, as well as superior water resistance, and thus is particularly suitable for the printing of photographic images. On the other hand, it is known that the image recorded thereon is subject to significant discoloration and fading due to ozone gas. However, since the ink composition of the present invention has superior ozone gas resistance, a significant effect is exerted even when used for inkjet recording on such a record-receiving material.

Examples of representative commercially available products as such a sheet having a porous white inorganic material coated thereon include the trade names: Professional Photopaper, Super Photopaper, Glossy Gold and Matte Photopaper manufactured by Canon, Inc.; trade names: Photo Paper CRISPIA (Super Glossy), Photo Paper (Glossy), and Photo Matte Paper manufactured by Seiko-Epson Corporation; trade name: Advanced Photo Paper (Glossy) manufactured by Hewlett Packard Japan, Ltd.; trade name: KASSAI SHASHIN-SHIAGE Pro manufactured by FUJIFILM Corporation; and the like.

Even in the case of using a medium, which is not provided with an ink-receiving layer, for use in gravure printing or offset printing as a communication sheet, a favorable image can be obtained using the ink composition of the invention.

It is also possible to preferably use plain paper which is not subjected to a surface treatment or the like as a communication sheet. In general, neither front face nor rear face of plain paper are coated and bleeding (feathering) of an aqueous ink often occurs easily on the surface along a fiber direction of exposed pulp. Therefore, in many cases, in order to suppress bleeding of the aqueous ink, a sizing agent is added in an amount of around 0.1% by mass with respect to the mass of pulp. The above-described plain paper has effects of suppressing the bleeding of the aqueous ink by adding a sizing agent and improving image quality. On the other hand, the plain paper has a feature of lowering the infiltration rate of the aqueous ink. Therefore, the plain paper is a medium for recording in which fast drying performance is not likely to be obtained in the case of inkjet recording that basically employs an infiltration drying system. However, even in the case of using these media, a favorable image can be obtained using the ink composition of the present invention, which is one of its important features.

When the medium provided with no ink-receiving layer is used, by carrying out a surface modification treatment, it is possible to obtain more favorable images.

As the surface modification treatment, it is preferable to use a surface modification method selected from a corona discharge treatment, a plasma treatment, and a flame treatment which are well-known. Here, it is generally known that the effect of the medium subjected to the surface modification treatment is temporally decreased. It is preferable to perform the surface modification treatment process and the inkjet printing process continuously, and it is most preferable to perform the surface modification treatment process immediately before the inkjet printing process.

The corona discharge treatment is a processing method in which a high voltage of several thousand volts is applied between a grounded metal roll and the needle-shaped electrodes arranged on the roll at an interval of several millimeters to generate corona discharge. By disposing a medium provided with no ink-receiving layer between the electrodes and the roll during corona discharging and then processing the medium, the surface of the medium is subject to a hydrophilic treatment so as to become a more favorable communication sheet.

The plasma treatment includes placing a polymeric material in a container containing argon, neon, helium, nitrogen, nitrogen dioxide, oxygen, air, or the like, exposing the material to plasma generated by glow discharge, and introducing a functional group including oxygen, nitrogen, or the like onto the surface of the material. In the case of the presence of an inert gas such as argon or neon under reduced pressure, it is believed that the surface of the medium provided with no ink-receiving layer is subject to attack by the generated plasma and thus radicals are generated on the surface thereof. Thereafter, by exposure to air, it is believed that the radical is bonded with oxygen and then a carboxylic group, a carbonyl group, an amino group, or the like is introduced to the surface of the polymeric material. In this way, the surface treatment process is carried out.

The flame treatment is also called a fire treatment and is a treatment of improving hydrophilicity by applying an oxidation gas flame or the like emanating from a burner to a chemically inactive surface to oxygenate the surface. The flame treatment is a well-known technique for those skilled in the art and a hydrophilic treatment can be carried out on the surface of a magnetic layer by using various well-known apparatuses.

In a case when a desired effect cannot be attained by performing the above-described surface treatment process on the medium provided with no ink-receiving layer, that is, in the case when the effect is difficult to attain depending on the types of media, it is possible to perform the treatment by increasing the number of surface treatment processes, the processing time, and the voltage applied.

When recording is performed on the record-receiving material such as a communication sheet by the inkjet recording method of the present invention, for example, recording may be performed on the record-receiving material by the above-described general recording method in such a manner that a container containing the above-described ink composition is set to a predetermined position of the inkjet printer.

In the inkjet recording method of the present invention, the black ink composition of the present invention can be used in combination with, for example, a well-known ink composition of each color such as magenta, cyan, yellow, as well as if necessary, green, blue (or violet), and red (or orange).

The ink composition of each color is injected into each container, and each container is loaded to a predetermined position of the inkjet printer, similarly to the container containing the black ink composition of the present invention, and then used in inkjet recording.

EXAMPLES

Hereinafter, the invention will be specifically described by Examples, but the invention is not intended to be limited by the following Examples. Incidentally, unless particularly stated otherwise, "part(s)" and "percent (%)" in the description are on a mass basis. In addition, unless particularly stated otherwise, each operation such as synthesis reaction and crystallization was carried out under stirring.

In these Examples, the polymerization rate, the mass average molecular weight (Mw), the molecular weight distribution (PDI), and the acid value of a block copolymer are evaluated according to the following methods.
(Polymerization Rate)
$^1$H-NMR was measured using an NMR apparatus and then the polymerization rate was calculated from a peak area ratio of a vinyl group of a monomer and an ester side chain of a polymer. AVANCE 500 (500 MHz, manufactured by Bruker BioSpin K.K.) was used as the NMR apparatus.
(Mass Average Molecular Weight (Mw) and Molecular Weight Distribution (PDI))
The mass average molecular weight (Mw) and the number average molecular weight (Mn) were measured by using GPC. The molecular weight distribution (PDI=Mw/Mn) was calculated from the measured value. The GPC measurement was carried out using HLC-8320GPC (manufactured by TOSOH Corporation) with two columns: TSK gel Super Multipore HZ-H (manufactured by TOSOH Corporation, 4.6 mm I.D.×15 cm), and tetrahydrofuran as an eluent. In addition, a TSK Standard (manufactured by TOSOH Corporation) was used as a standard sample.
(Acid Value)
The acid value is a value indicating the weight of potassium hydroxide required for the neutralization of an acidic component per 1 g of solid content. A solution prepared by dissolving 5.0 g of a measurement sample in 50 mL of tetrahydrofuran was titrated with a 0.5 M potassium hydroxide ethanolic solution by using a 1.0 w/v % phenolphthalein ethanol (90) solution as an indicator and the acid value was calculated by the following equation.

$$A = 56.11 \times Vs \times 0.5 \times f/w$$

A: Acid value (mgKOH/g)
Vs: Used amount (mL) of 0.5 M potassium hydroxide ethanolic solution required for titration
f: Titer of 0.5 M potassium hydroxide ethanolic solution
w: Weight (g) of measurement sample (in terms of solid content)

(A) Preparation of Polymerization Initiator

Synthesis Example 1: Synthesis of Ethyl-2-Methyl-2-n-Butyltellanyl-Propionate (Hereinafter, Referred to as "BTEE")

6.38 g (50 mmol) of metal tellurium (trade name: Tellurium (−40 mesh), manufactured by Aldrich Corporation) was suspended in 50 ml of THF. 34.4 mL (55 mmol) of n-butyllithium (manufactured by Aldrich Corporation, 1.6 M hexane solution) were gradually added dropwise to the obtained suspension at room temperature (for 10 minutes). The obtained reaction solution was stirred until the metal tellurium was completely dissolved (for 20 minutes). Next, 10.7 g (55 mmol) of ethyl-2-bromo-isobutyrate were added at room temperature and stirred for 2 hours. After completion of the reaction, the solvent was concentrated under reduced pressure, and subsequently, was distilled under reduced pressure, thereby obtaining 8.98 g (yield: 59.5%) of a yellow oily substance of BTEE.

Synthesis Example 2: Synthesis of Dibutyl Ditelluride (Hereinafter, Referred to as "DBDT")

3.19 g (25 mmol) of metal tellurium (trade name: Tellurium (−40 mesh), manufactured by Aldrich Corporation) was suspended in 25 ml of THF. 17.2 mL (27.5 mmol) of n-butyllithium (manufactured by Aldrich Corporation, 1.6 M hexane solution) were gradually added dropwise to the obtained suspension at 0° C. (for 10 minutes). The obtained reaction solution was stirred until the metal tellurium was completely dissolved (for 10 minutes). Next, 20 mL of ammonium chloride solution were added at room temperature and stirred for 1 hour. After completion of the reaction, the organic layer was separated and the water layer was extracted 3 times with diethyl ether. The collected organic layer was dried with anhydrous sodium sulfate and then concentrated under reduced pressure, thereby obtaining 4.41 g (11.93 mmol; yield: 95%) of a grape oily substance of DBDT.

(B) Preparation of Block Copolymer

Synthesis Example 3: Synthesis of Block Copolymer A

In a nitrogen-replaced glove box, 90 g (511 mmol) of benzyl methacrylate (manufactured by Tokyo Chemical Industry Co., Ltd.), 2.00 g (6.67 mmol) of BTEE, 1.22 g (3.33 mmol) of DBDT, 0.33 g (2.00 mmol) of 2,2'-azobis-isobutyronitrile (trade name: AIBN, manufactured by Otsuka Chemical Co., Ltd., hereinafter referred to as "AIBN"), and 90 g of methoxypropanol were charged into a flask equipped with a stirrer, and then reacted at 60° C. for 16 hours. The polymerization rate was 99.6%, the Mw was 16,200, and the PDI was 1.41.

45 g (317 mmol) of butyl methacrylate (manufactured by Tokyo Chemical Industry Co., Ltd.), 25 g (290 mmol) of methacrylic acid (manufactured by Tokyo Chemical Industry Co., Ltd.), 0.22 g (1.33 mmol) of AIBN, and 70 g of methoxypropanol were added to the obtained solution, and then reacted at 60° C. for 22 hours. The polymerization rate was 99.1%.

After completion of the reaction, the reaction solution was poured into 5 L of heptane, the produced precipitate was suction-filtrated, and then dried, thereby obtaining 138.2 g (yield: 86%) of white powdery block copolymer A. The acid value was 104. The Mw and the PDI were measured after a carboxylic component in the block copolymer was methyl-esterified. The Mw was 24,300 and the PDI was 1.49.

Synthesis Example 4: Synthesis of Block Copolymer B

In a nitrogen-replaced glove box, 90 g (511 mmol) of benzyl methacrylate (manufactured by Tokyo Chemical Industry Co., Ltd.), 3.00 g (10.0 mmol) of BTEE, 1.85 g (5.0 mmol) of DBDT, 0.33 g (2.00 mmol) of AIBN, and 90 g of methoxypropanol were charged into a flask equipped with a stirrer, and then reacted at 60° C. for 23 hours. The polymerization rate was 99.8%, the Mw was 11,800, and the PDI was 1.41.

45 g (317 mmol) of butyl methacrylate (manufactured by Tokyo Chemical Industry Co., Ltd.), 25 g (290 mmol) of methacrylic acid (manufactured by Tokyo Chemical Industry Co., Ltd.), 0.22 g (1.33 mmol) of AIBN, and 70 g of methoxypropanol were added to the obtained solution, and then reacted at 60° C. for 21 hours. The polymerization rate was 99.1%.

After completion of the reaction, the reaction solution was poured into 5 L of heptane, the produced precipitate was suction-filtrated, and then dried, thereby obtaining 155.2 g (yield: 97%) of white powdery block copolymer B. The acid value was 102. The Mw and the PDI were measured after a carboxylic component in the block copolymer was methyl-esterified. The Mw was 17,300 and the PDI was 1.31.

Synthesis Example 5: Synthesis of Block Copolymer C

In a nitrogen-replaced glove box, 90 g (511 mmol) of benzyl methacrylate (manufactured by Tokyo Chemical Industry Co., Ltd.), 1.50 g (5.0 mmol) of BTEE, 0.92 g (2.5 mmol) of DBDT, 0.25 g (1.50 mmol) of AIBN, and 90 g of methoxypropanol were charged into a flask equipped with a stirrer, and then reacted at 60° C. for 23 hours. The polymerization rate was 99.9%, the Mw was 21,500, and the PDI was 1.46.

45 g (317 mmol) of butyl methacrylate (manufactured by Tokyo Chemical Industry Co., Ltd.), 25 g (290 mmol) of methacrylic acid (manufactured by Tokyo Chemical Industry Co., Ltd.), 0.16 g (1.00 mmol) of AIBN, and 70 g of methoxypropanol were added to the obtained solution, and then reacted at 60° C. for 21 hours. The polymerization rate was 99.0%.

After completion of the reaction, the reaction solution was poured into 5 L of heptane, the produced precipitate was suction-filtrated, and then dried, thereby obtaining 157.9 g (yield: 99%) of white powdery block copolymer C. The acid value was 100. The Mw and the PDI were measured after a carboxylic component in the block copolymer was methyl-esterified. The Mw was 29,000 and the PDI was 1.39.

Synthesis Example 6: Synthesis of Block Copolymer D

In a nitrogen-replaced glove box, 90 g (511 mmol) of benzyl methacrylate (manufactured by Tokyo Chemical Industry Co., Ltd.), 1.00 g (3.33 mmol) of BTEE, 0.62 g (1.67 mmol) of DBDT, 0.16 g (1.00 mmol) of AIBN, and 90 g of methoxypropanol were charged into a flask equipped with a stirrer, and then reacted at 60° C. for 23 hours. The polymerization rate was 99.9%, the Mw was 21,500, and the PDI was 1.46.

45 g (317 mmol) of butyl methacrylate (manufactured by Tokyo Chemical Industry Co., Ltd.), 25 g (290 mmol) of methacrylic acid (manufactured by Tokyo Chemical Industry Co., Ltd.), 0.16 g (1.00 mmol) of AIBN, and 70 g of methoxypropanol were added to the obtained solution, and then reacted at 60° C. for 19 hours. The polymerization rate was 99.7%.

After completion of the reaction, the reaction solution was poured into 5 L of heptane, the produced precipitate was suction-filtrated, and then dried, thereby obtaining 138.1 g (yield: 86%) of white powdery block copolymer D. The acid value was 102. The Mw and the PDI were measured after a carboxylic component in the block copolymer was methyl-esterified. The Mw was 43,000 and the PDI was 1.40.

Synthesis Example 7: Synthesis of Block Copolymer E

In a nitrogen-replaced glove box, 90 g (511 mmol) of benzyl methacrylate (manufactured by Tokyo Chemical Industry Co., Ltd.), 2.00 g (6.67 mmol) of BTEE, 1.23 g (3.33 mmol) of DBDT, 0.33 g (1.33 mmol) of AIBN, and 90 g of methoxypropanol were charged into a flask equipped with a stirrer, and then reacted at 60° C. for 24 hours. The polymerization rate was 99.3%, the Mw was 17,200, and the PDI was 1.45.

48 g (338 mmol) of butyl methacrylate (manufactured by Tokyo Chemical Industry Co., Ltd.), 22 g (256 mmol) of methacrylic acid (manufactured by Tokyo Chemical Industry Co., Ltd.), 0.22 g (0.67 mmol) of AIBN, and 70 g of methoxypropanol were added to the obtained solution, and then reacted at 60° C. for 24 hours. The polymerization rate was 98.9%.

After completion of the reaction, the reaction solution was poured into 5 L of heptane, the produced precipitate was suction-filtrated, and then dried, thereby obtaining 153.3 g (yield: 96%) of white powdery block copolymer E. The acid value was 90. The Mw and the PDI were measured after a carboxylic component in the block copolymer was methyl-esterified. The Mw was 25,100 and the PDI was 1.29.

Synthesis Example 8: Synthesis of Block Copolymer F

In a nitrogen-replaced glove box, 90 g (511 mmol) of benzyl methacrylate (manufactured by Tokyo Chemical Industry Co., Ltd.), 2.00 g (6.67 mmol) of BTEE, 1.23 g (3.33 mmol) of DBDT, 0.33 g (1.33 mmol) of AIBN, and 90 g of methoxypropanol were charged into a flask equipped with a stirrer, and then reacted at 60° C. for 21 hours. The polymerization rate was 99.2%, the Mw was 17,300, and the PDI was 1.45.

40.7 g (286 mmol) of butyl methacrylate (manufactured by Tokyo Chemical Industry Co., Ltd.), 29.3 g (341 mmol) of methacrylic acid (manufactured by Tokyo Chemical Industry Co., Ltd.), 0.22 g (0.67 mmol) of AIBN, and 70 g of methoxypropanol were added to the obtained solution, and then reacted at 60° C. for 24 hours. The polymerization rate was 99.6%.

After completion of the reaction, the reaction solution was poured into 5 L of heptane, the produced precipitate was suction-filtrated, and then dried, thereby obtaining 153.9 g (yield: 96%) of white powdery block copolymer F. The acid value was 118. The Mw and the PDI were measured after a carboxylic component in the block copolymer was methyl-esterified. The Mw was 25,600 and the PDI was 1.30.

(C) Preparation of Aqueous Dispersion

Example 1

Magenta Aqueous Dispersion-1

6 parts of polymer dispersion agent (block copolymer B) obtained in Synthesis Example 4 were dissolved in 30 parts of 2-butanone to obtain a homogeneous solution. A liquid obtained by dissolving 0.44 parts of sodium hydroxide in 41 parts of ion exchange water was added thereto and stirred for 1 hour, thereby preparing an emulsified solution with the polymer dispersion agent dissolved in it. At this time, there was no deposition of crystals. 20 parts of C. I. Pigment Red 122 (manufactured by High Performance Colours Ltd., HPC Red 1220) were added to the emulsified solution and the dispersion was carried out using a sand grinder. The dispersion was carried out under the condition of 1,500 rpm for 15 hours. Thereafter, 100 parts of ion exchange water were added dropwise and filtrated to remove beads for dispersion, and then 2-butanone and water were distilled under reduced pressure by using an evaporator, thereby obtaining a magenta dispersion having a solid content of 15.1%. The solid content in the aqueous solution was measured by using MS-70 manufactured by A&D Company, Limited and calculated by a dry weight method. At this time, the pH was 9.7, the average particle diameter was 96 nm, and the viscosity was 6.0 mPa·s.

Example 2

Magenta Aqueous Dispersion-2

6 parts of polymer dispersion agent (block copolymer A) obtained in Synthesis Example 3 were dissolved in 30 parts of 2-butanone to obtain a homogeneous solution. A liquid obtained by dissolving 0.45 parts of sodium hydroxide in 42 parts of ion exchange water was added thereto and stirred for 1 hour, thereby preparing an emulsified solution with the polymer dispersion agent dissolved in it. At this time, there was no deposition of crystals. 20 parts of C. I. Pigment Red 122 (manufactured by High Performance Colours Ltd., HPC Red 1220) were added to the emulsified solution and the dispersion was carried out using a sand grinder. The dispersion was carried out under the condition of 1,500 rpm for 15 hours. Thereafter, 100 parts of ion exchange water were added dropwise and filtrated to remove beads for dispersion, and then 2-butanone and water were distilled under reduced pressure by using an evaporator, thereby obtaining a magenta dispersion having a solid content of 13.7%. The solid content in the aqueous solution was measured by using MS-70 manufactured by A&D Company, Limited and calculated by a dry weight method. At this time, the pH was 9.5, the average particle diameter was 80 nm, and the viscosity was 6.7 mPa·s.

Example 3

Magenta Aqueous Dispersion-3

6 parts of polymer dispersion agent (block copolymer C) obtained in Synthesis Example 5 were dissolved in 30 parts of 2-butanone to obtain a homogeneous solution. A liquid obtained by dissolving 0.43 part of sodium hydroxide in 42 parts of ion exchange water was added thereto and stirred for 1 hour, thereby preparing an emulsified solution with the polymer dispersion agent dissolved in it. At this time, there was no deposition of crystals. 20 parts of C. I. Pigment Red 122 (manufactured by High Performance Colours Ltd., HPC Red 1220) were added to the emulsified solution and the dispersion was carried out using a sand grinder. The dispersion was carried out under the condition of 1,500 rpm for 15 hours. Thereafter, 100 parts of ion exchange water were added dropwise and filtrated to remove beads for dispersion, and then 2-butanone and water were distilled under reduced pressure by using an evaporator, thereby obtaining a magenta dispersion having a solid content of 13.9%. The solid content in the aqueous solution was measured by using MS-70 manufactured by A&D Company, Limited and calculated by a dry weight method. At this time, the pH was 9.6, the average particle diameter was 102 nm, and the viscosity was 7.4 mPa·s.

Example 4

Magenta Aqueous Dispersion-4

6 parts of polymer dispersion agent (block copolymer D) obtained in Synthesis Example 6 were dissolved in 30 parts of 2-butanone to obtain a homogeneous solution. A liquid obtained by dissolving 0.44 parts of sodium hydroxide in 41 parts of ion exchange water was added thereto and stirred for 1 hour, thereby preparing an emulsified solution with the polymer dispersion agent dissolved in it. At this time, there was no deposition of crystals. 20 parts of C. I. Pigment Red 122 (manufactured by High Performance Colours Ltd., HPC Red 1220) were added to the emulsified solution and the dispersion was carried out using a sand grinder. The dispersion was carried out under the condition of 1,500 rpm for 15 hours. Thereafter, 100 parts of ion exchange water were added dropwise and filtrated to remove beads for dispersion, and then 2-butanone and water were distilled under reduced pressure by using an evaporator, thereby obtaining a magenta dispersion having a solid content of 12.7%. The solid content in the aqueous solution was measured by using MS-70 manufactured by A&D Company, Limited and calculated by a dry weight method. At this time, the pH was 9.6, the average particle diameter was 102 nm, and the viscosity was 20.2 mPa·s.

Example 5

Magenta Aqueous Dispersion-5

6 parts of polymer dispersion agent (block copolymer E) obtained in Synthesis Example 7 were dissolved in 30 parts of 2-butanone to obtain a homogeneous solution. A liquid obtained by dissolving 0.38 parts of sodium hydroxide in 88 parts of ion exchange water was added thereto and stirred for 1 hour, thereby preparing an emulsified solution with the polymer dispersion agent dissolved in it. At this time, there was no deposition of crystals. 20 parts of C. I. Pigment Red 122 (manufactured by High Performance Colours Ltd., HPC Red 1220) were added to the emulsified solution and the dispersion was carried out using a sand grinder. The dispersion was carried out under the condition of 1,500 rpm for 15 hours. Thereafter, 100 parts of ion exchange water were added dropwise and filtrated to remove beads for dispersion, and then 2-butanone and water were distilled under reduced pressure by using an evaporator, thereby obtaining a magenta dispersion having a solid content of 11.7%. The solid content in the aqueous solution was measured by using MS-70 manufactured by A&D Company, Limited and calculated by a dry weight method. At this time, the pH was 9.8, the average particle diameter was 104 nm, and the viscosity was 3.0 mPa·s.

Example 6

Magenta Aqueous Dispersion-6

6 parts of polymer dispersion agent (block copolymer F) obtained in Synthesis Example 8 were dissolved in 30 parts of 2-butanone to obtain a homogeneous solution. A liquid obtained by dissolving 0.51 parts of sodium hydroxide in 41 parts of ion exchange water was added thereto and stirred for 1 hour, thereby preparing an emulsified solution with the polymer dispersion agent dissolved in it. At this time, there was no deposition of crystals. 20 parts of C. I. Pigment Red 122 (manufactured by High Performance Colours Ltd., HPC Red 1220) were added to the emulsified solution and the dispersion was carried out using a sand grinder. The dispersion was carried out under the condition of 1,500 rpm for 15 hours. Thereafter, 100 parts of ion exchange water were added dropwise and filtrated to remove beads for dispersion, and then 2-butanone and water were distilled under reduced pressure by using an evaporator, thereby obtaining a magenta dispersion having a solid content of 12.68%. The solid content in the aqueous solution was measured by using MS-70 manufactured by A&D Company, Limited and calculated by a dry weight method. At this time, the pH was 9.6, the average particle diameter was 110 nm, and the viscosity was 10.4 mPa·s.

Comparative Example 1

Magenta Aqueous Dispersion-7

Instead of using the polymer dispersion agent (block copolymer B) described in Synthesis Example 4, 9 parts of Hi-Ros X VS-1202 manufactured by SEIKO PMC CORPORATION were dissolved in 30 parts of 2-butanone to obtain a homogeneous solution. The above-described dispersion agent is a random polymer configured from three kinds of monomer:methyl methacrylate, butyl methacrylate, and methacrylic acid, and the random polymer has an acid value of 140 mgKOH/g and a mass average molecular weight of 11,000. A liquid obtained by dissolving 0.9 parts of sodium hydroxide in 76 parts of ion exchange water was added to the solution dissolved with the dispersion agent and stirred for 1 hour, thereby preparing an emulsified solution with the polymer dispersion agent dissolved in it. At this time, there was no deposition of crystals. 30 parts of C. I. Pigment Red 122 (manufactured by High Performance Colours Ltd., HPC Red 1220) were added to the emulsified solution and the dispersion was carried out using a sand grinder. The dispersion was carried out under the condition of 1,500 rpm for 15 hours. Thereafter, 150 parts of ion exchange water were added dropwise and filtrated to remove beads for dispersion, and then 2-butanone and water were distilled under reduced pressure by using an evaporator, thereby obtaining a magenta dispersion having a solid content of 13.5%. The solid content in the aqueous solution was measured by using MS-70 manufactured by A&D Company, Limited and calculated by a dry weight method. At this time, the pH was 8.8, the average particle diameter was 181 nm, and the viscosity was 6.7 mPa·s.

Comparative Example 2

Magenta Aqueous Dispersion-8

Instead of using the polymer dispersion agent (block copolymer B) described in Synthesis Example 4, 18 parts of EFKA 4585 manufactured by Ciba Specialty Chemicals were dissolved in 30 parts of 2-butanone to obtain a homogeneous solution. The above-described dispersion agent is an A-B block polymer and is a 50% aqueous solution having an acid value of 20 mgKOH/g. 68 parts of ion exchange water were added to the solution dissolved with the dispersion agent and stirred for 1 hour, thereby preparing an emulsified solution with the polymer dispersion agent dissolved in it. At this time, there was no deposition of crystals. 30 parts of C. I. Pigment Red 122 (manufactured by High Performance Colours Ltd., HPC Red 1220) were added to the emulsified solution and the dispersion was carried out using a sand grinder. The dispersion was carried out under the condition of 1,500 rpm for 15 hours. Thereafter, 150 parts of ion exchange water were added dropwise and filtrated to remove beads for dispersion, and then 2-butanone and water were distilled under reduced pressure by using an evaporator, thereby obtaining a magenta dispersion having a solid content of 13.3%. The solid content in the aqueous solution was measured by using MS-70 manufactured by A&D Company, Limited and calculated by a dry weight method. At this time, the pH was 8.3, the average particle diameter was 133 nm, and the viscosity was 7.0 mPa·s.

Example 7

Black Aqueous Dispersion

A black aqueous dispersion was obtained in the same manner as in Example 2, except that C. I. Pigment Black 7 was used instead of C. I. Pigment Red 122 described in the above Example 2. The solid content of the dispersion was 12.9%, the pH was 7.9, the average particle diameter was 88 nm, and the viscosity was 4.6 mPa·s.

Example 8

Cyan Aqueous Dispersion

A cyan aqueous dispersion was obtained in the same manner as in Example 2, except that C. I. Pigment Blue 15:3 was used instead of C. I. Pigment Red 122 described in the above Example 2. The solid content of the dispersion was 12.4%, the pH was 9.2, the average particle diameter was 102 nm, and the viscosity was 6.2 mPa·s.

Example 9

Yellow Aqueous Dispersion

A yellow aqueous dispersion was obtained in the same manner as in Example 2, except that C. I. Pigment Yellow 74 was used instead of C. I. Pigment Red 122 described in the above Example 2. The solid content of the dispersion was 14.1%, the pH was 7.3, the average particle diameter was 82 nm, and the viscosity was 2.4 mPa·s.

(D) Evaluation of Aqueous Dispersion

Each aqueous dispersion obtained in Examples 1 to 9 and Comparative Examples 1 and 2 was placed in a hermetically-sealed container and left to stand still in a thermohygrostat at 70° C. for 7 days. Thereafter, the viscosity and the average particle diameter were measured and the evaluation was carried out.

The above-described physical properties having less difference from the initial value mean that stability is favorable and indicate that storage stability is excellent. From the results it can be seen that the aqueous dispersions of Examples 1 to 9 have no change from the initial values of the physical properties and are stable. On the other hand, it can be seen that, as for the aqueous dispersion of Comparative Example 2, the dispersion after storing is solidified and is not suitable as an aqueous dispersion.

(E) Ink Preparation-1

The ink composition of the invention was obtained by mixing the aqueous dispersions obtained in Examples 1 to 6 with each component described in the following Table 1. Thereafter, foreign substances were filtrated using a 3 μm membrane filter and thus the obtained inks were used as Examples 10 to 15. The obtained ink is hereinafter referred to as an "ink". In the same manner, inks 3 and 4 for Comparative Examples were prepared using the aqueous dispersions obtained in Comparative Examples 1 and 2. All inks were adjusted to have a pigment concentration of 6% and the balance was adjusted with ion exchange water.

TABLE 1

| | Ink | | | |
|---|---|---|---|---|
| Aqueous dispersion | Example 10 | Example 11 | Example 12 | Example 13 |
| Example 1 | 39.8 | — | — | — |
| Example 2 | — | 43.8 | — | — |
| Example 3 | — | — | 43.2 | — |
| Example 4 | — | — | — | 47.0 |
| Example 5 | — | — | — | — |
| Example 6 | — | — | — | — |
| Comparative Example 1 | — | — | — | — |
| Comparative Example 2 | — | — | — | — |
| Glycerin | 10 | 10 | 10 | 10 |
| PEG1540 | 3 | 3 | 3 | 3 |

TABLE 1-continued

| | | | | |
|---|---|---|---|---|
| 2-Pyrrolidone | 10 | 10 | 10 | 10 |
| 1,2-Hexanediol | 2 | 2 | 2 | 2 |
| Hexyl glycol | 0.35 | 0.35 | 0.35 | 0.35 |
| HITENOL NE-15 | 0.35 | 0.35 | 0.35 | 0.35 |
| Triethanolamine | 0.7 | 0.7 | 0.7 | 0.7 |
| Proxel GXL(s) | 0.05 | 0.05 | 0.05 | 0.05 |
| Ion exchange water | Balance | | | |
| Total | 100 | 100 | 100 | 100 |

| | Ink | | | |
|---|---|---|---|---|
| Aqueous dispersion | Example 14 | Example 15 | Comparative Example 3 | Comparative Example 4 |
| Example 1 | — | — | — | — |
| Example 2 | — | — | — | — |
| Example 3 | — | — | — | — |
| Example 4 | — | — | — | — |
| Example 5 | 51.1 | — | — | — |
| Example 6 | — | 47.3 | — | — |
| Comparative Example 1 | — | — | 44.3 | — |
| Comparative Example 2 | — | — | — | 45.0 |
| Glycerin | 10 | 10 | 10 | 10 |
| PEG1540 | 3 | 3 | 3 | 3 |
| 2-Pyrrolidone | 10 | 10 | 10 | 10 |
| 1,2-Hexanediol | 2 | 2 | 2 | 2 |
| Hexyl glycol | 0.35 | 0.35 | 0.35 | 0.35 |
| HITENOL NE-15 | 0.35 | 0.35 | 0.35 | 0.35 |
| Triethanolamine | 0.7 | 0.7 | 0.7 | 0.7 |
| Proxel GXL(s) | 0.05 | 0.05 | 0.05 | 0.05 |
| Ion exchange water | Balance | | | |
| Total | 100 | 100 | 100 | 100 |

(F) Evaluation of Redispersion Properties

25 µL of each ink of Examples 10 to 12 and Comparative Examples 3 and 4 described above were placed on a glass petri dish and dried by a thermo-hygrostat of 60° C. for 4 hours. To the dried ink, 2 mL of ion exchange water were added dropwise at room temperature and the evaluation was carried out by visually observing whether the ink was redispersed. Since the pigment solution spreads bleedingly, the redispersed solution could be visually determined. As the ink is redispersed well, clogging hardly occurs after drying the ink, which is excellent. The results are presented in Table 2. Incidentally, the evaluation is based on the following criteria.

S: There is no residue and the whole ink is redispersed.
A: The residue slightly remains but most of the ink is redispersed.
B: The residue largely remains but some of the ink is redispersed.
C: The ink is not redispersed at all.

TABLE 2

| | (F) Redispersion properties |
|---|---|
| Example 10 | S |
| Example 11 | S |
| Example 12 | S |
| Comparative Example 3 | B |
| Comparative Example 4 | B |

As is clearly apparent from the above results, it can be seen that the dispersion of each Example is extremely excellent in terms of stability as compared to the dispersions of Comparative Examples 1 and 2. In other words, this means that stability and redispersion properties are extremely favorable even in the case of storing as a dispersion. Furthermore, it can be seen that, even in the case of utilizing as an ink, there is little change in physical properties and the ink is superior to the ink of each Comparative Example.

INDUSTRIAL APPLICABILITY

The aqueous coloring agent dispersion for inkjet of the present invention is suitably used in an ink for inkjet. Moreover, the ink composition containing the aqueous coloring agent dispersion is extremely useful as an ink for inkjet recording.

What is claimed is:

1. An aqueous coloring agent dispersion for inkjet comprising at least a coloring agent (I), a liquid medium (II), and a polymer dispersion agent (III),
wherein the polymer dispersion agent (III) is an A-B block polymer obtained by copolymerizing, via a living radical polymerization method, y using as a polymerization initiator any one of a mixture of an organic tellurium compound and an organic ditellurium compound, and a mixture of the organic tellurium compound, an azo-based polymerization initiator, and the organic ditellurium compound,
wherein the organic tellurium compound is represented by the following formula (1):

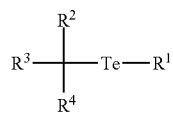

(1)

wherein, $R^1$ represents a $C_1$-$C_8$ alkyl group, an aryl group, a substituted aryl group, or an aromatic heterocyclic group; $R^2$ and $R^3$ represent a hydrogen atom or a $C_1$-$C_8$ alkyl group; and $R^4$ represents an aryl group, a substituted aryl group, an aromatic heterocyclic group, an acyl group, an amide group, an oxycarbonyl group, or a cyano group, and the organic ditellurium compound is represented by the following formula (2):

$$(R^1Te)_2 \qquad (2)$$

wherein, $R^1$ has the same meaning as in the above formula (1), wherein A and B are polymers obtained by polymerizing different monomers, and the monomer for configuring the A block is two kinds of monomers represented by the following formula (3) in which $R^5$ is a hydrogen atom and $R^6$ is a methyl group and a monomer in which $R^5$ is an n-butyl group and $R^6$ is a methyl group:

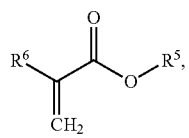
(3)

and the monomer for configuring the B block is benzyl methacrylate, wherein a mass ratio of the polymer dispersion agent (III) to the coloring agent (I) is 0.1 to 1.0, and wherein a mass average molecular weight of the B block to that of the polymer dispersion agent (III) is 50 to 74%.

2. The aqueous coloring agent dispersion for inkjet according to claim 1, wherein an acid value of the polymer dispersion agent (III) is 90 to 200 mgKOH/g.

3. The aqueous coloring agent dispersion for inkjet according to claim 1, wherein a mass average molecular weight of the polymer dispersion agent (III) is 10,000 to 60,000.

4. The aqueous coloring agent dispersion for inkjet according to claim 1, wherein the coloring agent (I) is a pigment or a disperse dye.

* * * * *